(12) United States Patent
Ogino

(10) Patent No.: US 6,985,613 B2
(45) Date of Patent: Jan. 10, 2006

(54) IMAGE PROCESSING METHOD AND APPARATUS, RECORDING MEDIUM AND IMAGING APPARATUS

(75) Inventor: Tetsuo Ogino, Tokyo (JP)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 792 days.

(21) Appl. No.: 09/973,148

(22) Filed: Oct. 8, 2001

(65) Prior Publication Data

US 2002/0094114 A1    Jul. 18, 2002

(30) Foreign Application Priority Data

Dec. 5, 2000  (JP)  ............................. 2000-369444

(51) Int. Cl.
*G06K 9/00*   (2006.01)

(52) U.S. Cl. ...................................................... 382/131
(58) Field of Classification Search ................ 382/128, 382/131
See application file for complete search history.

(56) References Cited

U.S. PATENT DOCUMENTS

| | | | | |
|---|---|---|---|---|
| 4,761,819 | A | * | 8/1988 | Denison et al. ............. 382/261 |
| 5,038,388 | A | * | 8/1991 | Song ........................... 382/266 |
| 5,933,540 | A | * | 8/1999 | Lakshminarayanan et al. ......................... 382/260 |
| 6,043,655 | A | * | 3/2000 | Makita et al. ............... 324/309 |
| 6,256,403 | B1 | * | 7/2001 | Florent et al. .............. 382/128 |
| 6,718,068 | B1 | * | 4/2004 | Gindele et al. ............. 382/254 |

FOREIGN PATENT DOCUMENTS

| | | |
|---|---|---|
| EP | 0505302 | 9/1992 |
| EP | 0610604 | 8/1994 |
| EP | 0884697 | 12/1998 |

* cited by examiner

*Primary Examiner*—Amelia M. Au
*Assistant Examiner*—Anthony Mackowey
(74) *Attorney, Agent, or Firm*—Moonray Kojima

(57) ABSTRACT

For the purpose of enhancing a difference between pixels relating to a substantial structure in an image and other pixels, with each pixel constituting an image defined as a pixel of interest, the variance of pixel values is determined in a local region to which the pixel of interest belongs (508); and the pixel value of the pixel of interest is maintained when the variance of pixel values is significantly larger than the variance of noise, otherwise the pixel value of the pixel of interest is suppressed (510, 512).

12 Claims, 11 Drawing Sheets

Blood flow tomographic images

IMAGE PROCESSING METHOD AND APPARATUS, RECORDING MEDIUM AND IMAGING APPARATUS

BACKGROUND OF THE INVENTION

The present invention relates to an image processing method and apparatus, recording medium and imaging apparatus, and particularly to an image processing method and apparatus for adjusting pixel values constituting an image, a medium recorded with a program for causing a computer to implement such an image processing function, and an imaging apparatus comprising such an image processing apparatus.

In a magnetic resonance imaging (MRI) apparatus, an object to be imaged is carried into an internal space of a magnet system, i.e., a space in which a static magnetic field is generated; gradient magnetic fields and a high frequency magnetic field is applied to cause spins within the object to generate magnetic resonance signals; and a tomographic image is produced based on the received signals.

The effect of the gradient magnetic fields and high frequency magnetic field on the spins is different between the spins that move inside the body such as those in blood flow, and the spins that do not move such as those in a tissue. By using this difference, an image of the spins that move inside the body, i.e., for example, a blood flow image, may be captured.

In capturing the blood flow image, a time-of-flight (TOF) technique, phase contrast (PC) technique or the like is employed.

A blood flow projection image in a three-dimensional region is obtained by using one of these techniques to capture multi-slice blood flow tomographic images with respect to the three-dimensional region, and performing maximum intensity projection (MIP) on the multi-slice blood flow tomographic images in the slice thickness direction.

When a projection image of blood flow is obtained as described above, faint blood flow may not be projected because it is obscured by noise. Moreover, when the average signal intensity of an image is different among slices, a blood flow image in an image with a small average signal intensity cannot be projected because it is obscured by noise in an image with a large average signal intensity.

SUMMARY OF THE INVENTION

It is therefore an object of the present invention to provide an image processing method and apparatus that enhance a difference between pixels relating to a substantial structure in an image and other pixels, a medium recorded with a program for causing a computer to implement such an image processing function, and an imaging apparatus comprising such an image processing apparatus.

(1) The present invention, in one aspect for solving the aforementioned problems, is an image processing method characterized in: with each pixel constituting an image defined as a pixel of interest, determining a variance of pixel values in a local region to which said pixel of interest belongs; and maintaining the pixel value of said pixel of interest when said determined variance is significantly larger than a variance of noise, otherwise suppressing the pixel value of said pixel of interest.

(2) The present invention, in another aspect for solving the aforementioned problems, is an image processing apparatus characterized in comprising: variance calculating means for, with each pixel constituting an image defined as a pixel of interest, determining a variance of pixel values in a local region to which said pixel of interest belongs; and pixel value adjusting means for maintaining the pixel value of said pixel of interest when said determined variance is significantly larger than a variance of noise, otherwise suppressing the pixel value of said pixel of interest.

(3) The present invention, in still another aspect for solving the aforementioned problems, is a recording medium characterized in being recorded in a computer-readable manner with a program for causing a computer to implement the functions of: with each pixel constituting an image defined as a pixel of interest, determining a variance of pixel values in a local region to which said pixel of interest belongs; and maintaining the pixel value of said pixel of interest when said determined variance is significantly larger than a variance of noise, otherwise suppressing the pixel value of said pixel of interest.

(4) The present invention, in still another aspect for solving the aforementioned problems, is an imaging apparatus for producing an image based on signals collected from an object, characterized in comprising: variance calculating means for, with each pixel constituting an image defined as a pixel of interest, determining a variance of pixel values in a local region to which said pixel of interest belongs; and pixel value adjusting means for maintaining the pixel value of said pixel of interest when said determined variance is significantly larger than a variance of noise, otherwise suppressing the pixel value of said pixel of interest.

According to the invention in the aspects as described in (1)–(4) above, with each pixel constituting an image defined as a pixel of interest, a variance of pixel values is determined in a local region to which the pixel of interest belongs, and the pixel value of the pixel of interest is maintained when the determined variance is significantly larger than a variance of noise, otherwise the pixel value of the pixel of interest is suppressed; and therefore a difference between pixels relating to a substantial structure in an image and other pixels can be enhanced.

(5) The present invention, in still another aspect for solving the aforementioned problems, is an image processing method characterized in: with each pixel constituting an image defined as a pixel of interest, determining a variance of pixel values in a local region to which said pixel of interest belongs; and enhancing the pixel value of said pixel of interest when said determined variance is significantly larger than a variance of noise, otherwise maintaining the pixel value of said pixel of interest.

(6) The present invention, in still another aspect for solving the aforementioned problems, is an image processing apparatus characterized in comprising: variance calculating means for, with each pixel constituting an image defined as a pixel of interest, determining a variance of pixel values in a local region to which said pixel of interest belongs; and pixel value adjusting means for enhancing the pixel value of said pixel of interest when said determined variance is significantly larger than a variance of noise, otherwise maintaining the pixel value of said pixel of interest.

(7) The present invention, in still another aspect for solving the aforementioned problems, is a recording medium characterized in being recorded in a computer-readable manner with a program for causing a computer to implement the functions of: with each pixel constituting an image defined as a pixel of interest, determining a variance of pixel values in a local region to which said pixel of interest belongs; and enhancing the pixel value of said pixel of interest when said determined variance is significantly larger than a variance of noise, otherwise maintaining the pixel value of said pixel of interest.

(8) The present invention, in still another aspect for solving the aforementioned problems, is an imaging apparatus for producing an image based on signals collected from an object, characterized in comprising: variance calculating means for, with each pixel constituting an image defined as a pixel of interest, determining a variance of pixel values in a local region to which said pixel of interest belongs; and pixel value adjusting means for enhancing the pixel value of said pixel of interest when said determined variance is significantly larger than a variance of noise, otherwise maintaining the pixel value of said pixel of interest.

According to the invention in the aspects as described in (5)–(8) above, with each pixel constituting an image defined as a pixel of interest, a variance of pixel values is determined in a local region to which the pixel of interest belongs, and the pixel value of the pixel of interest is enhanced when the determined variance is significantly larger than a variance of noise, otherwise the pixel value of the pixel of interest is maintained; and therefore a difference between pixels relating to a substantial structure in an image and other pixels can be enhanced.

Moreover, in the aspects as described in (1)–(8) above, the image may be a blood flow image to thereby enhance a difference between pixels relating to a blood flow image and other pixels.

Furthermore, according to the invention in the aspects as described in (4) and (8) above, the signals may be magnetic resonance signals to thereby implement the invention for a magnetic resonance image.

(9) The present invention, in still another aspect for solving the aforementioned problems, is an image processing method characterized in: with each pixel constituting multi-slice images defined as a pixel of interest, determining a variance of pixel values in a local region to which said pixel of interest belongs; performing pixel value adjustment involving maintaining the pixel value of said pixel of interest when said determined variance is significantly larger than a variance of noise, otherwise suppressing the pixel value of said pixel of interest; and performing maximum intensity projection on the multi-slice images subjected to said pixel value adjustment.

(10) The present invention, in still another aspect for solving the aforementioned problems, is an image processing apparatus characterized in comprising: variance calculating means for, with each pixel constituting multi-slice images defined as a pixel of interest, determining a variance of pixel values in a local region to which said pixel of interest belongs; pixel value adjusting means for maintaining the pixel value of said pixel of interest when said determined variance is significantly larger than a variance of noise, otherwise suppressing the pixel value of said pixel of interest; and maximum intensity projecting means for performing maximum intensity projection on the multi-slice images subjected to said pixel value adjustment.

(11) The present invention, in still another aspect for solving the aforementioned problems, is a recording medium characterized in being recorded in a computer-readable manner with a program for causing a computer to implement the functions of: with each pixel constituting multi-slice images defined as a pixel of interest, determining a variance of pixel values in a local region to which said pixel of interest belongs; performing pixel value adjustment involving maintaining the pixel value of said pixel of interest when said determined variance is significantly larger than a variance of noise, otherwise suppressing the pixel value of said pixel of interest; and performing maximum intensity projection on the multi-slice images subjected to said pixel value adjustment.

(12) The present invention, in still another aspect for solving the aforementioned problems, is an imaging apparatus for producing an image based on signals collected from an object, characterized in comprising: variance calculating means for, with each pixel constituting multi-slice images defined as a pixel of interest, determining a variance of pixel values in a local region to which said pixel of interest belongs; pixel value adjusting means for maintaining the pixel value of said pixel of interest when said determined variance is significantly larger than a variance of noise, otherwise suppressing the pixel value of said pixel of interest; and maximum intensity projecting means for performing maximum intensity projection on the multi-slice images subjected to said pixel value adjustment.

According to the invention in the aspects as described in (9)–(12) above, with each pixel constituting multi-slice images defined as a pixel of interest, a variance of pixel values is determined in a local region to which the pixel of interest belongs, and the pixel value of the pixel of interest is maintained when the determined variance is significantly larger than a variance of noise, otherwise the pixel value of the pixel of interest is suppressed; and therefore a difference between pixels relating to a substantial structure in an image and other pixels can be enhanced. In addition, since the multi-slice images subjected to such difference enhancement are maximum-intensity-projected, a projection image of pixels that have faint signal intensity and relate to a substantial structure in an image can be obtained.

(13) The present invention, in still another aspect for solving the aforementioned problems, is an image processing method characterized in: with each pixel constituting multi-slice images defined as a pixel of interest, determining a variance of pixel values in a local region to which said pixel of interest belongs; performing pixel value adjustment involving enhancing the pixel value of said pixel of interest when said determined variance is significantly larger than a variance of noise, otherwise maintaining the pixel value of said pixel of interest; and performing maximum intensity projection on the multi-slice images subjected to said pixel value adjustment.

(14) The present invention, in still another aspect for solving the aforementioned problems, is an image processing apparatus characterized in comprising: variance calculating means for, with each pixel constituting multi-slice images defined as a pixel of interest, determining a variance of pixel values in a local region to which said pixel of interest belongs; pixel value adjusting means for enhancing the pixel value of said pixel of interest when said determined variance is significantly larger than a variance of noise, otherwise maintaining the pixel value of said pixel of interest; and maximum intensity projecting means for performing maximum intensity projection on the multi-slice images subjected to said pixel value adjustment.

(15) The present invention, in still another aspect for solving the aforementioned problems, is a recording medium characterized in being recorded in a computer-readable manner with a program for causing a computer to implement the functions of: with each pixel constituting multi-slice images defined as a pixel of interest, determining a variance of pixel values in a local region to which said pixel of interest belongs; performing pixel value adjustment involving enhancing the pixel value of said pixel of interest when said determined variance is significantly larger than a variance of noise, otherwise maintaining the pixel value of said pixel of interest; and performing maximum intensity projection on the multi-slice images subjected to said pixel value adjustment.

(16) The present invention, in still another aspect for solving the aforementioned problems, is an imaging apparatus for producing an image based on signals collected from an object, characterized in comprising: variance calculating means for, with each pixel constituting multi-slice images defined as a pixel of interest, determining a variance of pixel values in a local region to which said pixel of interest belongs; pixel value adjusting means for enhancing the pixel value of said pixel of interest when said determined variance is significantly larger than a variance of noise, otherwise maintaining the pixel value of said pixel of interest; and maximum intensity projecting means for performing maximum intensity projection on the multi-slice images subjected to said pixel value adjustment.

According to the invention in the aspects as described in (13)–(16) above, with each pixel constituting multi-slice images defined as a pixel of interest, a variance of pixel values is determined in a local region to which the pixel of interest belongs, and the pixel value of the pixel of interest is enhanced when the determined variance is significantly larger than a variance of noise, otherwise the pixel value of the pixel of interest is maintained; and therefore a difference between pixels relating to a substantial structure in an image and other pixels can be enhanced. In addition, since the multi-slice images subjected to such difference enhancement are maximum-intensity-projected, a projection image of pixels that have faint signal intensity and relate to a substantial structure in an image can be obtained.

Moreover, according to the invention in the aspects as described in (9)–(16) above, the image may be a blood flow image to thereby enhance a difference between pixels relating to a blood flow image and other pixels; and by maximum-intensity-projecting the multi-slice images subjected to such difference enhancement, a projection image of faint blood flow can be obtained.

Furthermore, according to the invention in the aspects as described in (12) and (16) above, the signals may be magnetic resonance signals to thereby implement the invention for a magnetic resonance image.

(17) The present invention, in still another aspect for solving the aforementioned problems, is an image processing method characterized in: with each pixel constituting multi-slice images defined as a pixel of interest, determining a variance of pixel values in a local region to which said pixel of interest belongs; adding to said determined variance a variance of pixel values in a local region to which a corresponding pixel of interest in an image of a neighboring slice belongs; performing pixel value adjustment involving maintaining the pixel value of said pixel of interest when said added variance is significantly larger than a variance of noise, otherwise suppressing the pixel value of said pixel of interest; and performing maximum intensity projection on the multi-slice images subjected to said pixel value adjustment.

(18) The present invention, in still another aspect for solving the aforementioned problems, is an image processing apparatus characterized in comprising: variance calculating means for, with each pixel constituting multi-slice images defined as a pixel of interest, determining a variance of pixel values in a local region to which said pixel of interest belongs; adding means for adding to said determined variance a variance of pixel values in a local region to which a corresponding pixel of interest in an image of a neighboring slice belongs; pixel value adjusting means for maintaining the pixel value of said pixel of interest when said added variance is significantly larger than a variance of noise, otherwise suppressing the pixel value of said pixel of interest; and maximum intensity projecting means for performing maximum intensity projection on the multi-slice images subjected to said pixel value adjustment.

(19) The present invention, in still another aspect for solving the aforementioned problems, is a recording medium characterized in being recorded in a computer-readable manner with a program for causing a computer to implement the functions of: with each pixel constituting multi-slice images defined as a pixel of interest, determining a variance of pixel values in a local region to which said pixel of interest belongs; adding to said determined variance a variance of pixel values in a local region to which a corresponding pixel of interest in an image of a neighboring slice belongs; performing pixel value adjustment involving maintaining the pixel value of said pixel of interest when said added variance is significantly larger than a variance of noise, otherwise suppressing the pixel value of said pixel of interest; and performing maximum intensity projection on the multi-slice images subjected to said pixel value adjustment.

(20) The present invention, in still another aspect for solving the aforementioned problems, is an imaging apparatus for producing an image based on signals collected from an object, characterized in comprising: variance calculating means for, with each pixel constituting multi-slice images defined as a pixel of interest, determining a variance of pixel values in a local region to which said pixel of interest belongs; adding means for adding to said determined variance a variance of pixel values in a local region to which a corresponding pixel of interest in an image of a neighboring slice belongs; pixel value adjusting means for maintaining the pixel value of said pixel of interest when said added variance is significantly larger than a variance of noise, otherwise suppressing the pixel value of said pixel of interest; and maximum intensity projecting means for performing maximum intensity projection on the multi-slice images subjected to said pixel value adjustment.

According to the invention in the aspects as described in (17)–(20) above, with each pixel constituting multi-slice images defined as a pixel of interest, a variance of pixel values is determined in a local region to which the pixel of interest belongs, a variance of pixel values in a local region to which a corresponding pixel of interest in an image of a neighboring slice belongs is added to the determined variance, and the pixel value of the pixel of interest is maintained when the added value is significantly larger than a variance of noise, otherwise the pixel value of the pixel of interest is suppressed; and therefore a difference between pixels relating to a substantial structure in an image and other pixels can be further enhanced. In addition, since the multi-slice images subjected to such difference enhancement are maximum-intensity-projected, a better projection image of pixels that have faint signal intensity and relate to a substantial structure in an image can be obtained.

(21) The present invention, in still another aspect for solving the aforementioned problems, is an image processing method characterized in: with each pixel constituting multi-slice images defined as a pixel of interest, determining a variance of pixel values in a local region to which said pixel of interest belongs; adding to said determined variance a variance of pixel values in a local region to which a corresponding pixel of interest in an image of a neighboring slice belongs; performing pixel value adjustment involving enhancing the pixel value of said pixel of interest when said added variance is significantly larger than a variance of noise, otherwise maintaining the pixel value of said pixel of interest; and performing maximum intensity projection on the multi-slice images subjected to said pixel value adjustment.

(22) The present invention, in still another aspect for solving the aforementioned problems, is an image processing apparatus characterized in comprising: variance calculating means for, with each pixel constituting multi-slice images defined as a pixel of interest, determining a variance of pixel values in a local region to which said pixel of interest belongs; adding means for adding to said determined variance a variance of pixel values in a local region to which a corresponding pixel of interest in an image of a neighboring slice belongs; pixel value adjusting means for enhancing the pixel value of said pixel of interest when said added variance is significantly larger than a variance of noise, otherwise maintaining the pixel value of said pixel of interest; and maximum intensity projecting means for performing maximum intensity projection on the multi-slice images subjected to said pixel value adjustment.

(23) The present invention, in still another aspect for solving the aforementioned problems, is a recording medium characterized in being recorded in a computer-readable manner with a program for causing a computer to implement the functions of: with each pixel constituting multi-slice images defined as a pixel of interest, determining a variance of pixel values in a local region to which said pixel of interest belongs; adding to said determined variance a variance of pixel values in a local region to which a corresponding pixel of interest in an image of a neighboring slice belongs; performing pixel value adjustment involving enhancing the pixel value of said pixel of interest when said added variance is significantly larger than a variance of noise, otherwise maintaining the pixel value of said pixel of interest; and performing maximum intensity projection on the multi-slice images subjected to said pixel value adjustment.

(24) The present invention, in still another aspect for solving the aforementioned problems, is an imaging apparatus for producing an image based on signals collected from an object, characterized in comprising: variance calculating means for, with each pixel constituting multi-slice images defined as a pixel of interest, determining a variance of pixel values in a local region to which said pixel of interest belongs; adding means for adding to said determined variance a variance of pixel values in a local region to which a corresponding pixel of interest in an image of a neighboring slice belongs; pixel value adjusting means for enhancing the pixel value of said pixel of interest when said added variance is significantly larger than a variance of noise, otherwise maintaining the pixel value of said pixel of interest; and maximum intensity projecting means for performing maximum intensity projection on the multi-slice images subjected to said pixel value adjustment.

According to the invention in the aspects as described in (21)–(24) above, with each pixel constituting multi-slice images defined as a pixel of interest, a variance of pixel values is determined in a local region to which the pixel of interest belongs, a variance of pixel values in a local region to which a corresponding pixel of interest in an image of a neighboring slice belongs is added to the determined variance, and the pixel value of the pixel of interest is enhanced when the added value is significantly larger than a variance of noise, otherwise the pixel value of the pixel of interest is maintained; and therefore a difference between pixels relating to a substantial structure in an image and other pixels can be further enhanced. In addition, since the multi-slice images subjected to such difference enhancement are maximum-intensity-projected, a better projection image of pixels that have faint signal intensity and relate to a substantial structure in an image can be obtained.

Moreover, according to the invention in the aspects as described in (17)–(24) above, the image may be a blood flow image to thereby further enhance a difference between pixels relating to a blood flow image and other pixels; and by maximum-intensity-projecting the multi-slice images subjected to such difference enhancement, a better projection image of faint blood flow can be obtained.

Furthermore, according to the invention in the aspects as described in (20) and (24) above, the signals may be magnetic resonance signals to thereby implement the invention for a magnetic resonance image.

In the invention in the aspects as described in (1)–(24) above, it is preferred to determine a residual sum of squares of pixel values for each of a plurality of local regions defined over the entire image, determine a histogram of the residual sums of squares, and then determine the variance of noise based on a residual sum of squares that gives a peak of the histogram, in that the variance of noise can be obtained directly based on an image.

Therefore, the present invention can provide an image processing method and apparatus that enhance a difference between pixels relating to a substantial structure in an image and other pixels, a medium recorded with a program for causing a computer to implement such an image processing function, and an imaging apparatus comprising such an image processing apparatus.

Further objects and advantages of the present invention will be apparent from the following description of the preferred embodiments of the invention as illustrated in the accompanying drawings.

DETAILED DESCRIPTION OF THE INVENTION

Figure 1:
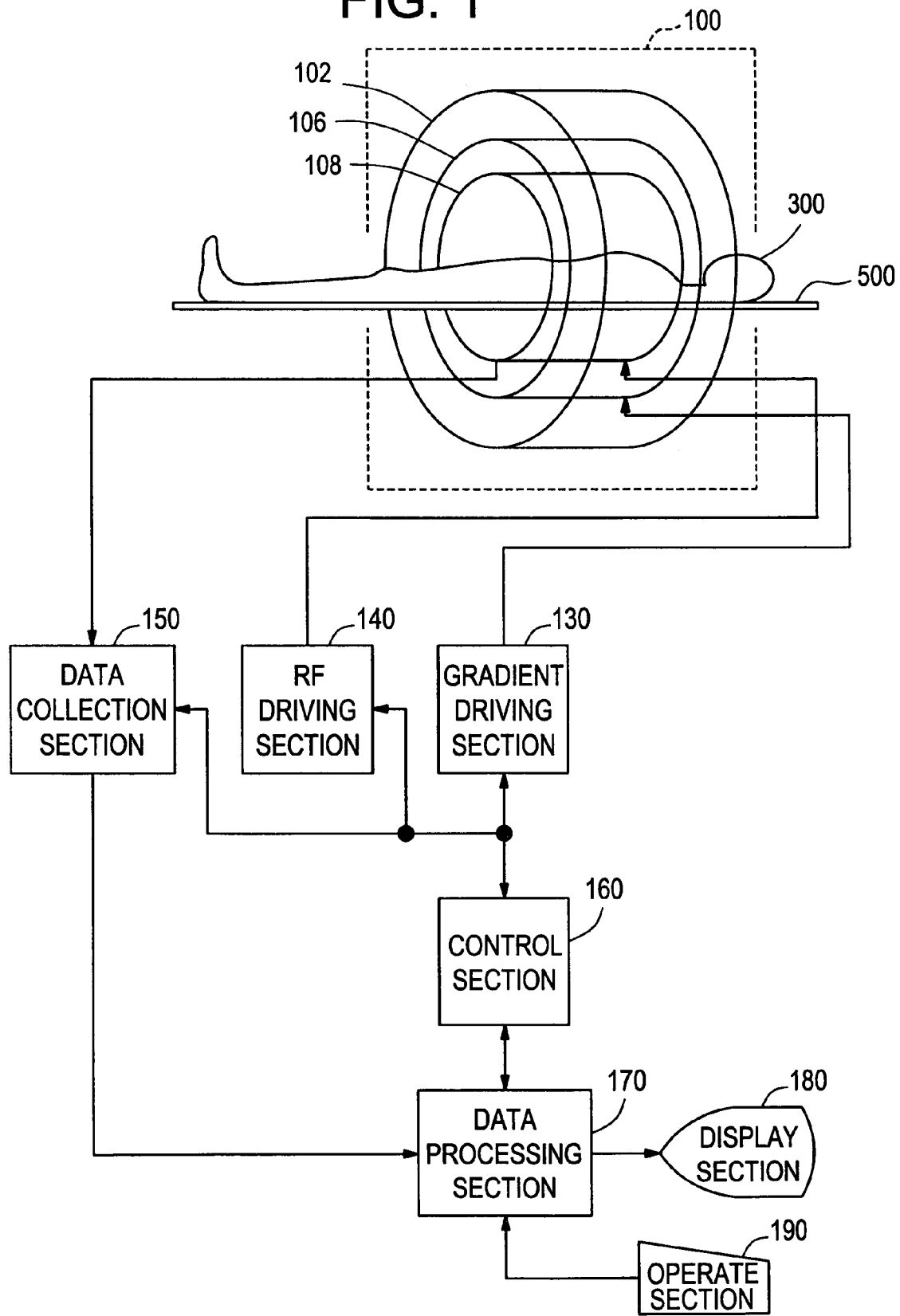
FIG. 1 is a block diagram of an apparatus in accordance with one embodiment of the present invention.

Embodiments of the present invention will now be described in detail with reference to the accompanying drawings. It should be noted that the present invention is not limited to these embodiments. FIG. 1 shows a block diagram of an imaging apparatus, or a magnetic resonance imaging (MRI) apparatus, which is an embodiment of the present invention. The configuration of the apparatus represents an embodiment of the apparatus in accordance with the present invention. The operation of the apparatus represents an embodiment of the method in accordance with the present invention.

As shown in FIG. 1, the present apparatus has a magnet system 100. The magnet system 100 has a main magnetic field coil section 102, a gradient coil section 106 and an RF (radio frequency) coil section 108. These coil sections have a generally cylindrical shape and are concentrically disposed. An object to be imaged 300 is rested on a cradle 500 and carried into and out of the generally cylindrical internal space (bore) of the magnet system 100 by carrier means, which is not shown.

The main magnetic field coil section 102 generates a static magnetic field in the internal space of the magnet system 100. The direction of the static magnetic field is generally in parallel with the direction of the body axis of the object 300. That is, a "horizontal" magnetic field is generated. The main magnetic field coil section 102 is made using a superconductive coil, for example. It will be easily recognized that the main magnetic field coil section 102 is not limited to the superconductive coil, but may be made using a normal conductive coil or the like.

The gradient coil section 106 generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106 has three gradient coils, which are not shown, corresponding to these three gradient magnetic fields.

The RF coil section 108 generates a high frequency magnetic field for exciting spins within the object 300 in the static magnetic field space. The generation of the high frequency magnetic field will be sometimes referred to as transmission of an RF excitation signal hereinbelow. The RF coil section 108 also receives electromagnetic waves, i.e., magnetic resonance signals, generated by the excited spins.

The RF coil section 108 has transmitting and receiving coils, which are not shown. For the transmitting and receiving coils, the same coil or separate dedicated coils may be used.

The gradient coil section 106 is connected with a gradient driving section 130. The gradient driving section 130 supplies driving signals to the gradient coil section 106 to generate the gradient magnetic fields. The gradient driving section 130 has three driving circuits, which are not shown, corresponding to the three gradient coils in the gradient coil section 106.

The RF coil section 108 is connected with an RF driving section 140. The RF driving section 140 supplies driving signals to the RF coil section 108 to transmit the RF excitation signal, thereby exciting the spins within the object 300.

The RF coil section 108 is connected with a data collecting section 150. The data collecting section 150 gathers receive signals received by the RF coil section 108, and collects the signals as view data.

The gradient driving section 130, RF driving section 140 and data collecting section 150 are connected with a control section 160. The control section 160 controls the gradient driving section 130, RF driving section 140 and data collecting section 150 to carry out imaging.

The output of the data collecting section 150 is connected to a data processing section 170. The data processing section 170 is, for example, constituted using a computer. The data processing section 170 has a memory, which is not shown. The memory stores programs for the data processing section 170 and several kinds of data. The function of the present apparatus is implemented by the data processing section 170 executing a program stored in the memory.

The data processing section 170 stores the view data gathered from the data collecting section 150 into the memory. A data space is formed in the memory. The data space constitutes a two-dimensional Fourier space. The two-dimensional Fourier space is sometimes referred to as a k-space. The data processing section 170 performs a two-dimensional inverse Fourier transformation on the data in the two-dimensional Fourier space to produce (reconstruct) an image of the object 300.

The image reconstructed by the two-dimensional inverse Fourier transformation has pixel values of a complex number. The absolute value of the complex number is used to construct an absolute-value image. The real part of the complex number can be used to construct a real-part image. The imaginary part of the complex number can be used to construct an imaginary-part image. Both the real part and the imaginary part can be positive and negative values. Such an image is sometimes referred to as a positive-negative image.

The data processing section 170 has the function of performing image processing for determining the variance of pixel values with respect to a reconstructed image. The data processing section 170 also has the function of performing image processing for determining the variance of noise with respect to the reconstructed image. The data processing section 170 further has the function of performing image processing for adjusting the pixel values with respect to the reconstructed image. The data processing section 170 furthermore has the function of performing image processing for executing maximum intensity projection (MIP) with respect to the image subjected to the pixel value adjustment. Such image processing functions of the data processing section 170 will be described later.

The data processing section 170 is an embodiment of the image processing apparatus of the present invention. The configuration of the apparatus represents an embodiment of the apparatus in accordance with the present invention. The operation of the apparatus represents an embodiment of the method in accordance with the present invention.

The data processing section 170 is connected to the control section 160. The data processing section 170 is above the control section 160 and controls it. The data processing section 170 is connected with a display section 180 and an operating section 190. The display section 180 comprises a graphic display, etc. The operating section 190 comprises a keyboard, etc., provided with a pointing device.

The display section 180 displays the reconstructed image and several kinds of information output from the data processing section 170. The operating section 190 is operated by a human operator, and the section 190 inputs several commands, information and so forth to the data processing section 170. The operator interactively operates the present apparatus via the display section 180 and operating section 190.

Figure 2:
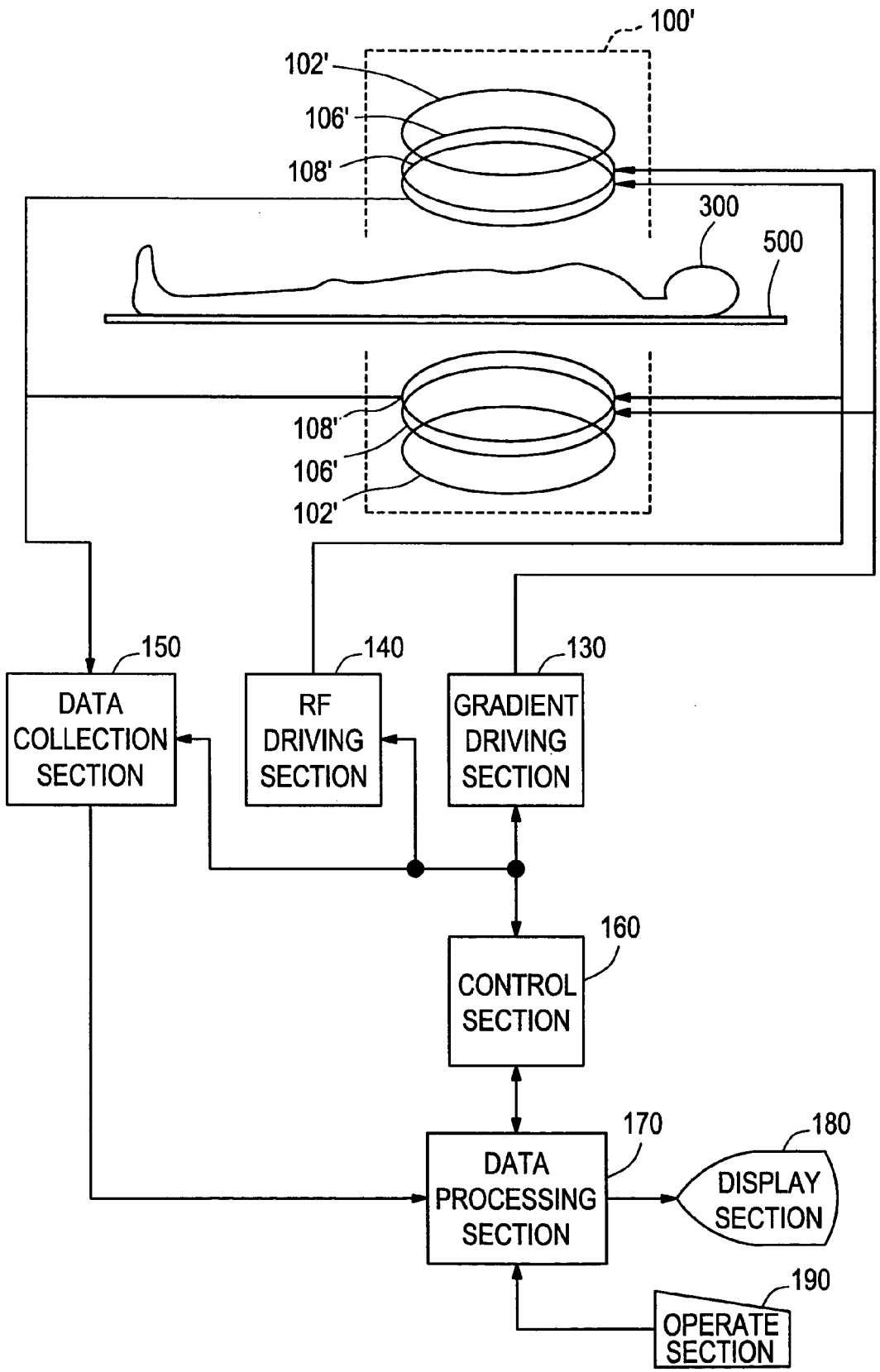
FIG. 2 is a block diagram of an apparatus in accordance with one embodiment of the present invention.

FIG. 2 is a block diagram of an MRI apparatus of another type, which is one embodiment of the present invention. The configuration of the apparatus represents an embodiment of the apparatus in accordance with the present invention.

The apparatus shown in FIG. 2 has a magnet system 100' of a type different from that in the apparatus shown in FIG. 1. Since the apparatus has a configuration similar to that of the apparatus shown in FIG. 1 except for the magnet system 100', similar portions are designated by similar reference numerals and the explanation thereof will be omitted.

The magnet system 100' has a main magnetic field magnet section 102', a gradient coil section 106' and an RF coil section 108'. The main magnetic field magnet section 102' and the coil sections each consists of a pair of members facing each other across a space. These sections have a generally disk-like shape and are disposed to have a common center axis. The object 300 is rested on the cradle 500 and carried into and out of the internal space (bore) of the magnet system 100' by carrier means, which is not shown.

The main magnetic field magnet section 102' generates a static magnetic field in the internal space of the magnet system 100'. The direction of the static magnetic field is generally orthogonal to the direction of the body axis of the object 300. That is, a "vertical" magnetic field is generated. The main magnetic field magnet section 102' is made using a permanent magnet, for example. It will be easily recognized that the main magnetic field magnet section 102' is not limited to a permanent magnet, but may be made using a super or normal conductive electromagnet or the like.

The gradient coil section 106' generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106' has three gradient coils, which are not shown, corresponding to these three gradient magnetic fields.

The RF coil section 108' transmits an RF excitation signal for exciting spins within the object 300 in the static magnetic field space. The RF coil section 108' also receives magnetic resonance signals generated by the excited spins. The RF coil section 108' has transmitting and receiving coils, which are not shown. For the transmitting and receiving coils, the same coil or separate dedicated coils may be used.

Figure 3:
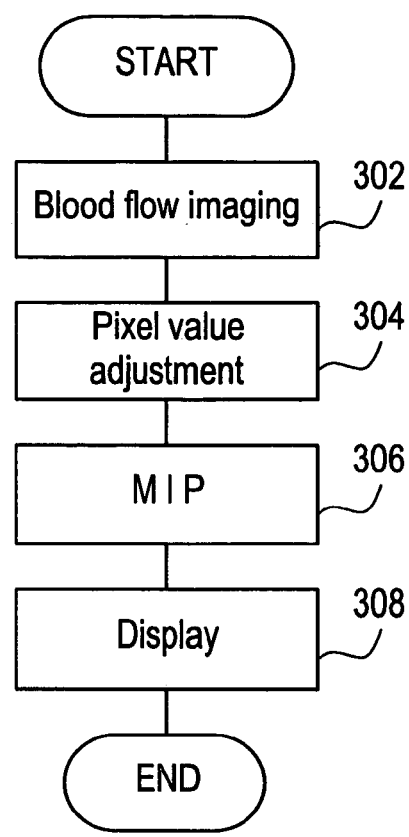
FIG. 3 is a flow chart of the operation of the apparatus shown in FIGS. 1 or 2.
Figure 4:
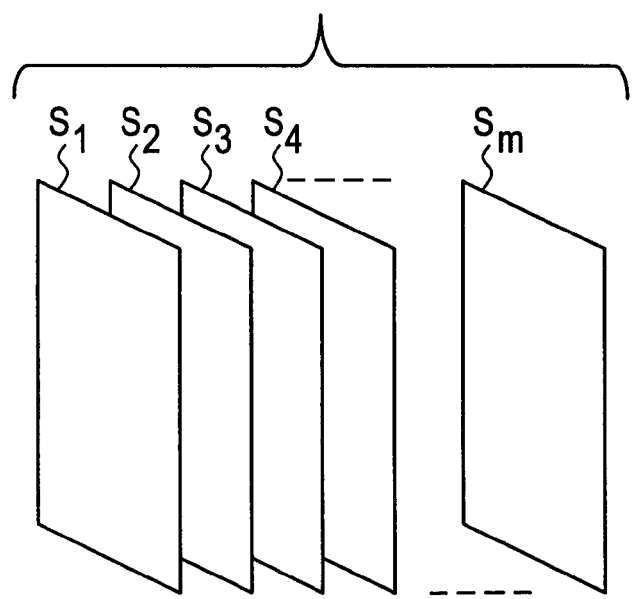
FIG. 4 is a conceptual diagram of multi-slice images.

FIG. 3 shows a flow chart of the operation of the present apparatus. Both the apparatuses shown in FIGS. 1 and 2 operate in the same way. As shown in FIG. 3, blood flow imaging is performed at Step 302. For the blood flow imaging, a time-of-flight (TOF) technique, phase contrast (PC) technique or the like is employed. Moreover, the imaging is performed in multi-slice. Thus, multi-slice blood flow tomographic images S1, S2, S3, . . . , Sm are captured with respect to a three-dimensional region of the object 300, as conceptually shown in FIG. 4.

Next, at Step 304, pixel value adjustment is performed on the blood flow tomographic images S1, S2, S3, . . . , Sm. The pixel value adjustment is implemented by the data processing function of the data processing section 170. The blood flow tomographic image will be referred to simply as an image hereinbelow.

Figure 5:
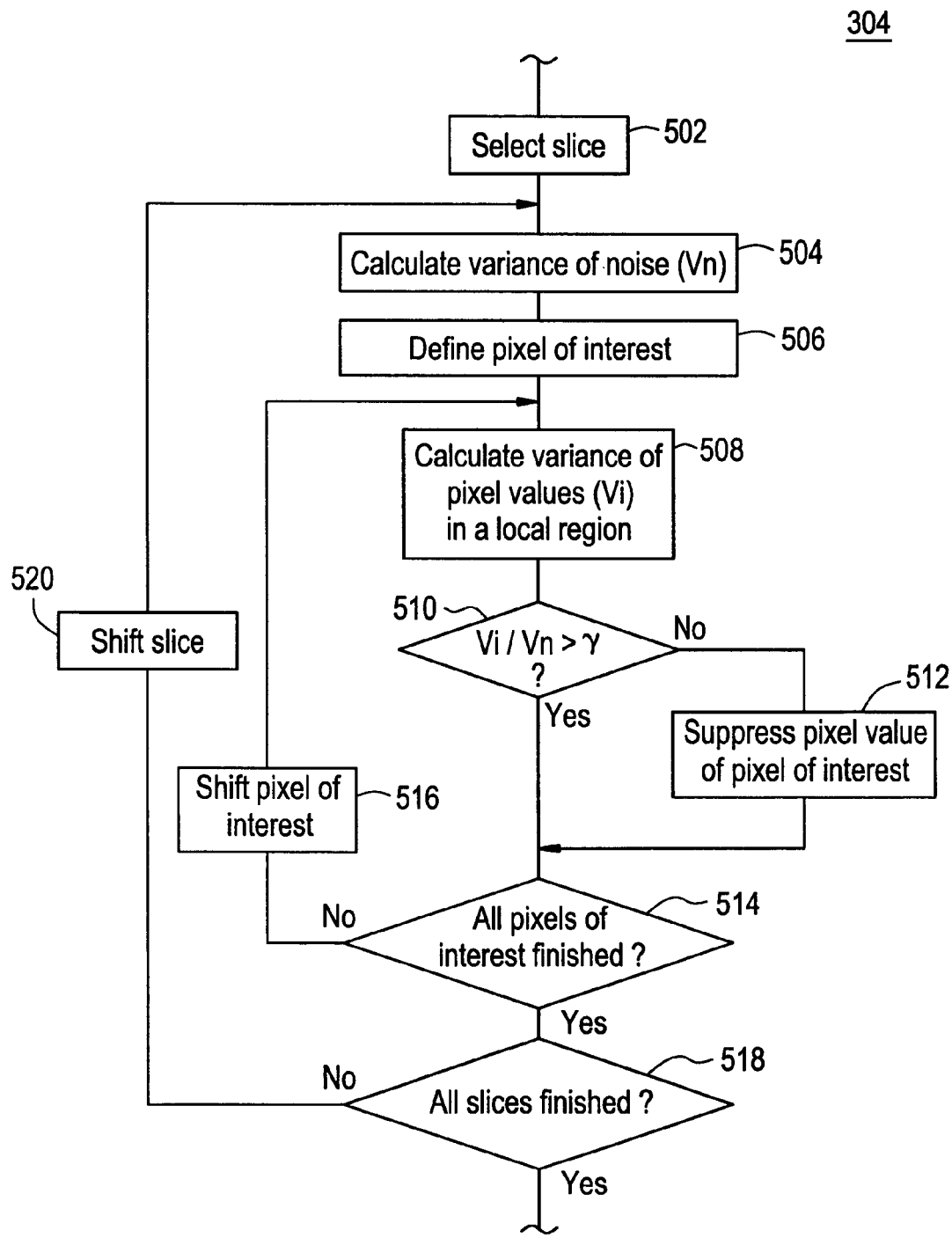
FIG. 5 is a detailed flow chart of part of the flow chart shown in FIG. 3.

FIG. 5 shows a detailed flow chart of the pixel value adjustment. As shown, slice selection is performed at Step 502. Thus, one of the images S1, S2, S3, . . . , Sm, for example, the image S1, is selected.

Figure 6:
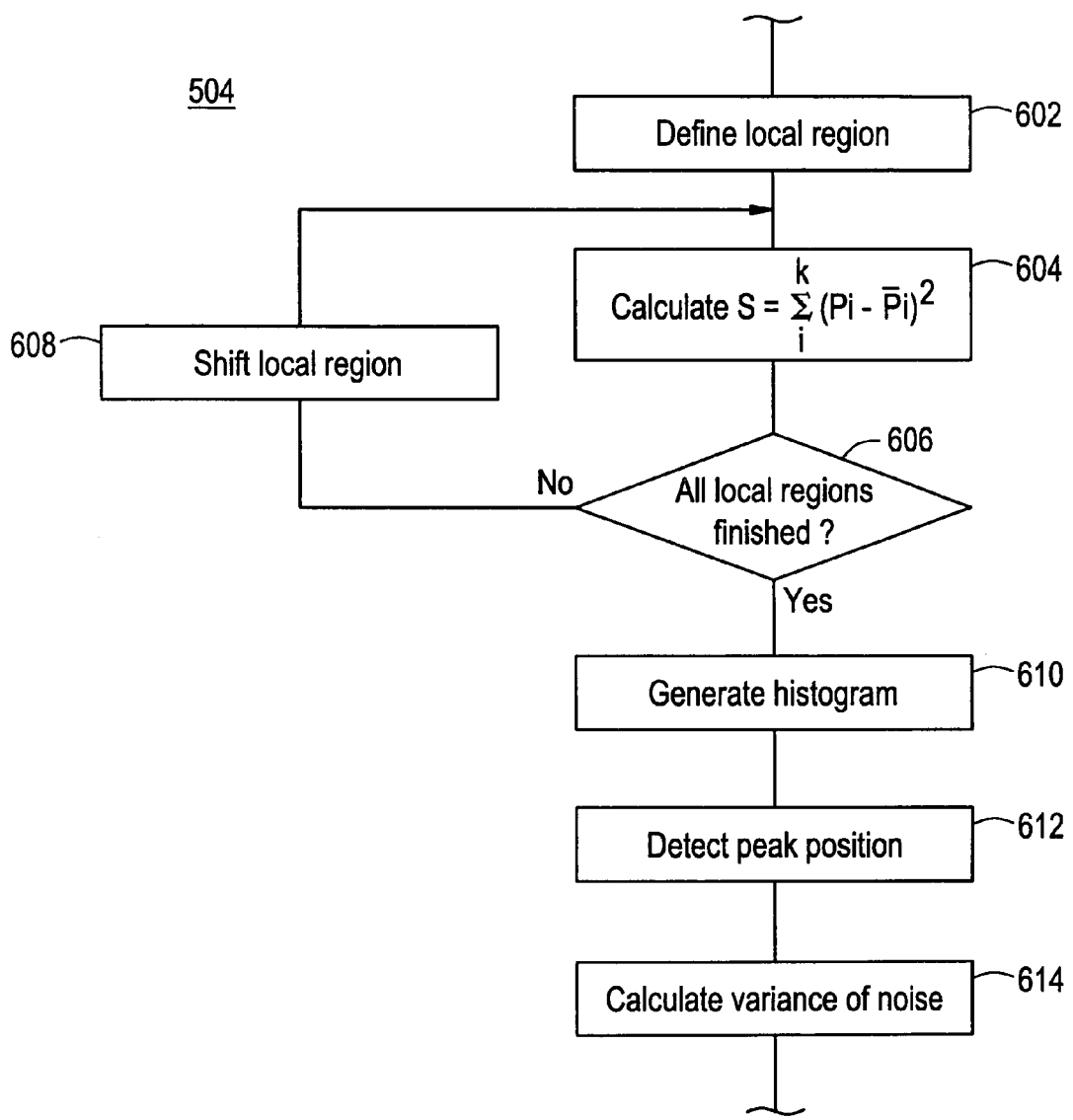
FIG. 6 is a detailed flow chart of part of the flow chart shown in FIG. 5.

Next, at Step 504, calculation of the variance of noise is performed. The data processing section 170 that calculates the variance of noise at Step 504 is an embodiment of the noise variance calculating means of the present invention. FIG. 6 shows a detailed flow chart of the noise variance calculation. As shown, a local region is defined in an image at Step 602. The local region is a region to which a pixel value for use in a calculation at the next step belongs. A local region in a center of an image, for example, is defined as the first region.

As the local region, an N×N pixel matrix is employed. N is 9, for example. It should be noted that the matrix size is not limited to this value but may be any appropriate one. Moreover, the pixel matrix is not limited to a square matrix but may be any appropriate region centered on a pixel. The local region will sometimes be referred to simply as a region hereinbelow.

Next, at Step 604, a residual sum of squares S of pixel values that belong to the region is determined. Specifically, $$S = \sum_{i}^{k} (P_i - \overline{P}_i)^2, \tag{1}$$

wherein:

$P_i$ is a pixel value, and $\overline{P}_i$ is an average value of the pixel values in the N×N region centered on $P_i$. Moreover, k is, for example, 81.

Next, at Step 606, a decision is made as to whether the above processes are finished for all the local regions, and if not, the local region is shifted at Step 608. Thus, an adjacent N×N region, for example, is selected as a new local region.

The process of Step 604 is performed on the new local region to determine the residual sum of squares of pixel values. Thereafter, a residual sum of squares of pixel values is determined for every local region in the image in a similar manner.

The residual sums of squares thus obtained have a $\chi^2$ distribution, and the average value thereof is $k \cdot \sigma^2$. When k is large, the $\chi^2$ distribution approximates to a Gaussian distribution, and its peak position lies approximately at $k \cdot \sigma^2$.

Next, at Step 610, a histogram of the residual sums of squares S is generated.

Figure 7:
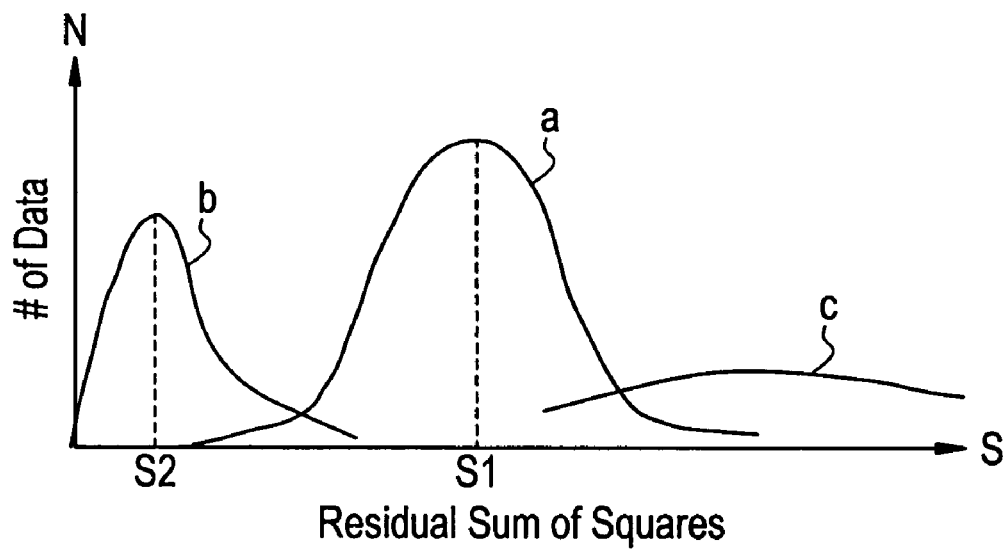
FIG. 7 is a conceptual diagram of a histogram.

FIG. 7 shows the concept of the histogram of the residual sums of squares S when the image is an absolute-value image. As shown, the histogram consists of three distribution curves a, b and c.

The distribution curve a is a Gaussian distribution curve, resulting from noise in the uniform structure portion. The distribution curve b is a Rayleigh distribution curve, resulting from noise in a portion of an FOV (field of view) that does not contain the object 300, i.e., noise in a background. Because the image is an absolute-value image, the distribution curve resulting from noise in the background does not conform to the Gaussian distribution but to the Rayleigh distribution. The distribution curve c results from the fine structure of the object, and exhibits an indeterminate distribution, unlike the two other curves.

At Step 612, peak position detection is performed for such a histogram. Thus, a peak position s1 is detected for the Gaussian distribution curve a, and a peak position s2 is detected for the Rayleigh distribution curve b.

Since the histogram has discrete values in practice, fitting to a function is preferably performed at Step 612 prior to the peak detection, in that the peak positions can be detected with a good accuracy. The functions employed in the fitting are, for example, a Gaussian distribution function and a Rayleigh distribution function, respectively. However, the functions are not limited thereto but may be any other appropriate one.

Next, at Step 614, the variance of noise is calculated. The calculation of the variance of noise is performed based on the peak position s1 or s2.

Since s1, s2 and σ have respective relationships:

$$S_1 = k \cdot \sigma^2, \quad (2)$$

and $$S_2 = \left(2 - \frac{\pi}{2}\right) k \cdot \sigma^2, \quad (3)$$

the value of σ is determined from these relationships. The value of σ is the same whether it is determined from Eq. (2) or from Eq. (3). The determined value of σ is stored in the memory as the variance of noise Vn.

Under some conditions of the distribution curve c, the peak position s1 of the Gaussian distribution curve a may not be accurately detected. In this case, the value of σ is determined based on the peak position s2 of the Rayleigh distribution curve b. Moreover, with respect to an image having a larger proportion of the background portion area, the Rayleigh distribution curve b is more suitable for determining the variance of noise with a good accuracy.

While the preceding description is made for a case of an absolute-value image, when the image to be processed is a positive-negative image, i.e., a real-part image or an imaginary-part image, noise in the background portion has positive and negative values centered on zero.

Figure 8:
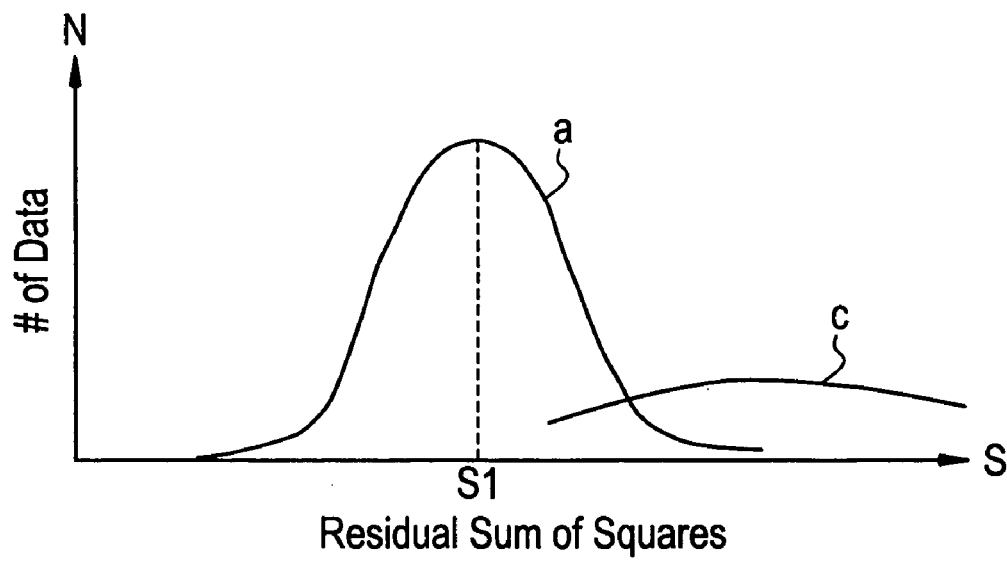
FIG. 8 is a conceptual diagram of a histogram.

Accordingly, the histogram generated at Step 610 becomes one as exemplarily shown in FIG. 8, and it no longer has the Rayleigh distribution. In this case, the variance of noise is determined based on the peak position s1 of the Gaussian distribution curve a at Step 614.

A value of the variance of noise can thus be obtained directly based on an image that is actually captured. If the variance of noise is previously known, that variance may be used and the calculation may be omitted.

After the variance of noise Vn is thus determined, a pixel of interest is defined in the image at Step 506 in the flow chart of FIG. 5. The first pixel of interest is, for example, a pixel in the center of the image.

Figure 9:
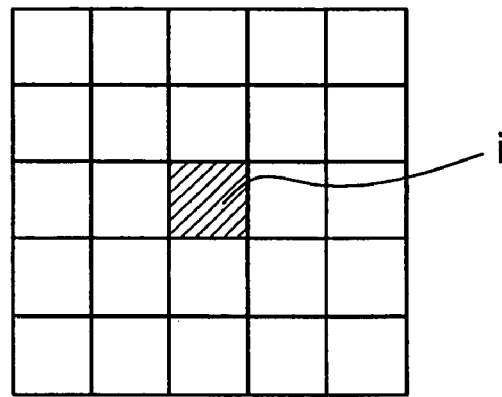
FIG. 9 is a diagram illustrating a relationship between a pixel of interest and a local region.

Next, at Step 508, the variance of pixel values Vi in a local region that contains the pixel of interest is calculated. The local region that contains the pixel of interest is, for example, a 5×5 matrix centered on the pixel of interest i, as shown in FIG. 9. It should be noted that the matrix size is not limited to this value but may be any appropriate one. Moreover, the pixel matrix is not limited to a square matrix but may be any appropriate region centered on a pixel. The local region will sometimes be referred to simply as a region hereinbelow. The data processing section 170 that calculates the variance of pixel values Vi at Step 508 is an embodiment of the variance calculating means of the present invention.

The following equation is employed for the calculation of the variance of pixel values Vi:

$$V_i = \frac{\sum_{i}^{k}(P_i - \overline{P_i})^2}{k}, \quad (4)$$

wherein k=25.

Next, at Step 510, a decision is made as to whether the variance of pixel values Vi is significantly larger than the variance of noise Vn. The decision is made using the following formula:

$$\frac{V_i}{V_n} > \gamma, \quad (5)$$

wherein:
  γ: a threshold value.

For the value of the threshold γ, an appropriate value greater than one is employed.

If the variance of pixel values in the local region that contains the pixel of interest is not significantly greater than the variance of noise, the image in the local region probably has no prominent structure, and the variance of pixel values probably originates from noise.

Hence, in this case, the pixel value of the pixel of interest is suppressed at Step 512. The suppression of the pixel value is achieved by, for example, multiplying the pixel value by a coefficient α. The value of the coefficient α is a positive number less than one, for example, 0.8. Thus, the pixel value of the pixel of interest is reduced by, for example, 0.8 times the original value. However, the value of the coefficient α is not limited to 0.8 but may be any appropriate one. Moreover, the suppression of the pixel value may be achieved by, for example, subtracting a certain predefined value from the pixel value. It should be noted that the constant value does not exceed the minimum of the pixel values.

If the variance of pixel values Vi in the local region that contains the pixel of interest is significantly greater than the variance of noise Vn, the image in the local region probably has a specific structure, such as an edge, and the variance of pixel values probably originates from the structure of the image. In this case, no special operation is applied to the pixel value. Thus, the pixel value of the pixel of interest maintains its original value. The data processing section 170 that performs such pixel value adjustment is an embodiment of the pixel value adjusting means of the present invention.

Next, at Step 514, a decision is made as to whether the above processes are finished for all the pixels of interest, and if not, the pixel of interest is shifted to, for example, the adjacent one at Step 516, and the processes from Step 508 are performed. Thereafter, the same processes are repeated to adjust the pixel value for every pixel in the image S1.

Then, at Step 518, a decision is made as to whether the above processes are finished for all the slices, and if not, the slice is shifted at Step 520, and the same processes are performed on the image of that slice. Thereafter, the same processes are repeated to perform the pixel value adjustment on the pixels in all the images S1–Sm.

Figure 10:
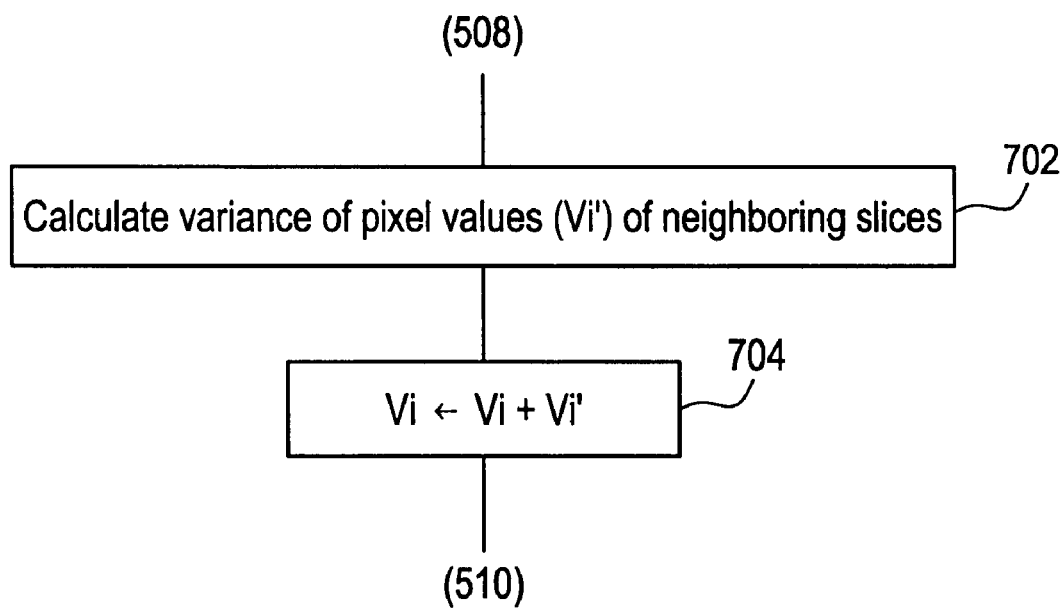
FIG. 10 is a flow chart of a procedure inserted as part of the flow chart shown in FIG. 5.

Between Steps 508 and 510, steps as shown in the flow chart of FIG. 10 may be added. Specifically, the variance of pixel values Vi' is calculated for a local region that contains a corresponding pixel of interest in a neighboring slice at Step 702.

The term 'neighboring slice' implies one or more slices adjoining the slice for which the variance of pixel values Vi has been determined at Step 508. For such slices, a slice adjoining the front or the rear, or slices adjoining the front and rear may be employed, for example.

At Step 704, the variance(s) of pixel values Vi' is added to Vi, and the added value is defined as a variance of pixel values Vi for use in the decision at next Step 510. An appropriate weight may be applied to Vi' in the addition. The data processing section 170 that calculates the variances of pixel values at Step 702 is an embodiment of the pixel value variance calculating means of the present invention. The data processing section 170 that adds the variances of pixel values at Step 704 is an embodiment of the adding means of the present invention.

Thus, a structure across a plurality of slices is reflected in the variance of pixel values Vi obtained by the above processing. Therefore, for example, if a blood flow image exists in a direction passing through slices, which image should appear as one point on one image, a variance of pixel values exactly reflecting such a structure can be obtained, and more exact pixel value adjustment can be achieved based on the variance.

Figure 11:
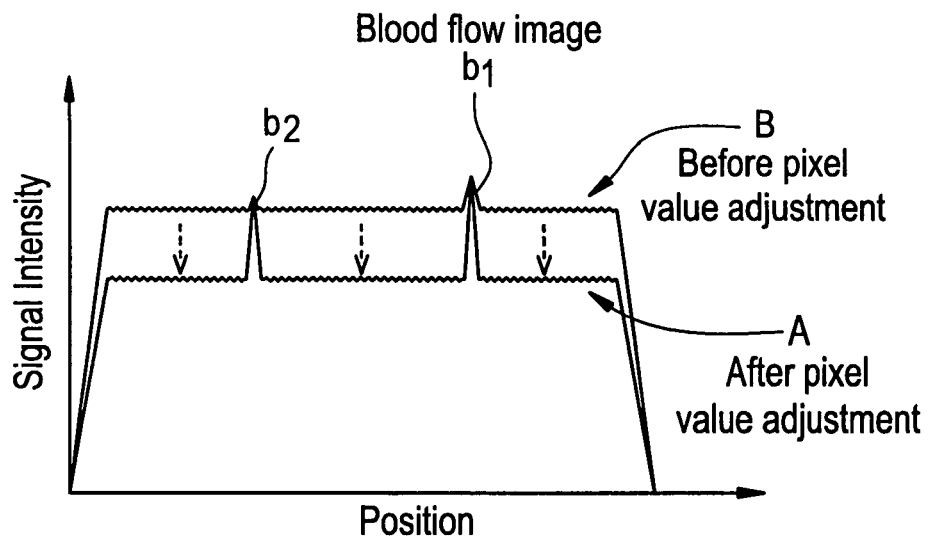
FIG. 11 is an example of image profiles showing an effect of pixel value adjustment.

FIG. 11 shows an effect of such pixel value adjustment as a change in a pixel value profile. The symbol B in FIG. 11 denotes a profile before the pixel value adjustment, and there exist a distinct blood flow image b1 and a faint blood flow image b2 over background noise.

As a result of the above-described pixel value adjustment, such a profile has pixel values of the background noise suppressed by, for example, 0.8 times while maintaining pixel values of the blood flow images b1 and b2, resulting in a profile as shown at A in FIG. 11. In the profile A, the blood flow image b2 which was faint in the original image exhibits an enlarged difference from the background noise and becomes distinct, not to mention the blood flow image b1. Thus, elicitability of the blood flow image b2 that was faint in the original image can be enhanced.

Figure 12:
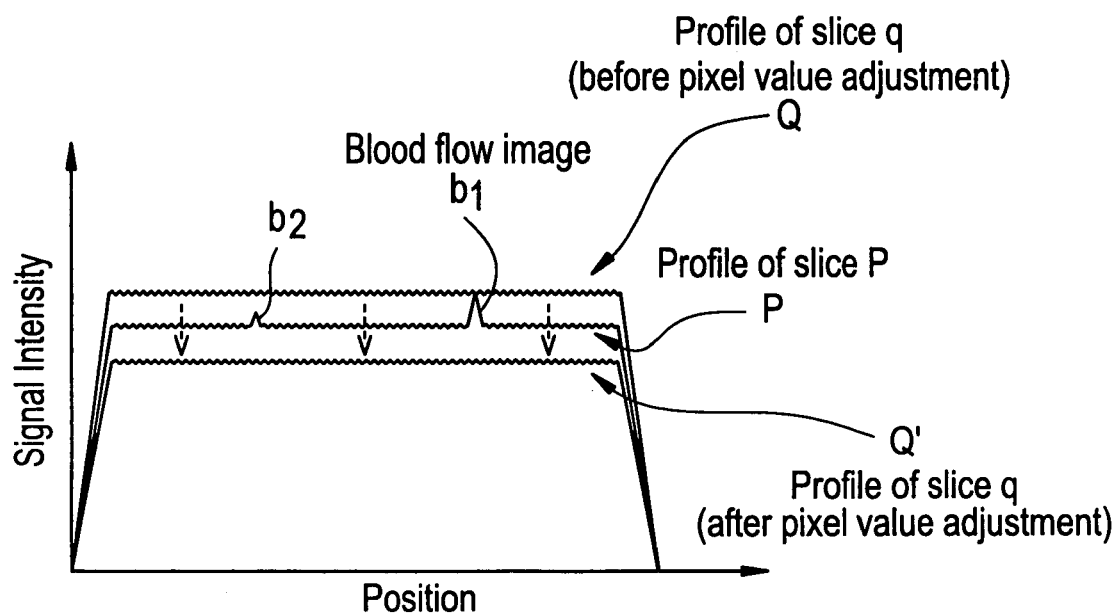
FIG. 12 is an example of image profiles showing an effect of pixel value adjustment.

FIG. 12 shows another effect of the pixel value adjustment. The symbols P and Q in FIG. 12 denote profiles of two images of different slices, and the background noise level of the profile Q is larger than the signal intensity of a distinct blood flow image b1 in the profile P.

By the aforementioned pixel value adjustment, such profiles have pixel values of the background noise suppressed by, for example, 0.8 times and therefore a profile can be obtained that has the noise level reduced relative to the signal intensity of the blood flow images b1 and b2, as shown at Q' in FIG. 12. Thus, a difference of the blood flow images b1 and b2 from the noise level of the image of the slice Q also becomes distinct, and both images can be elicited.

Figure 13:
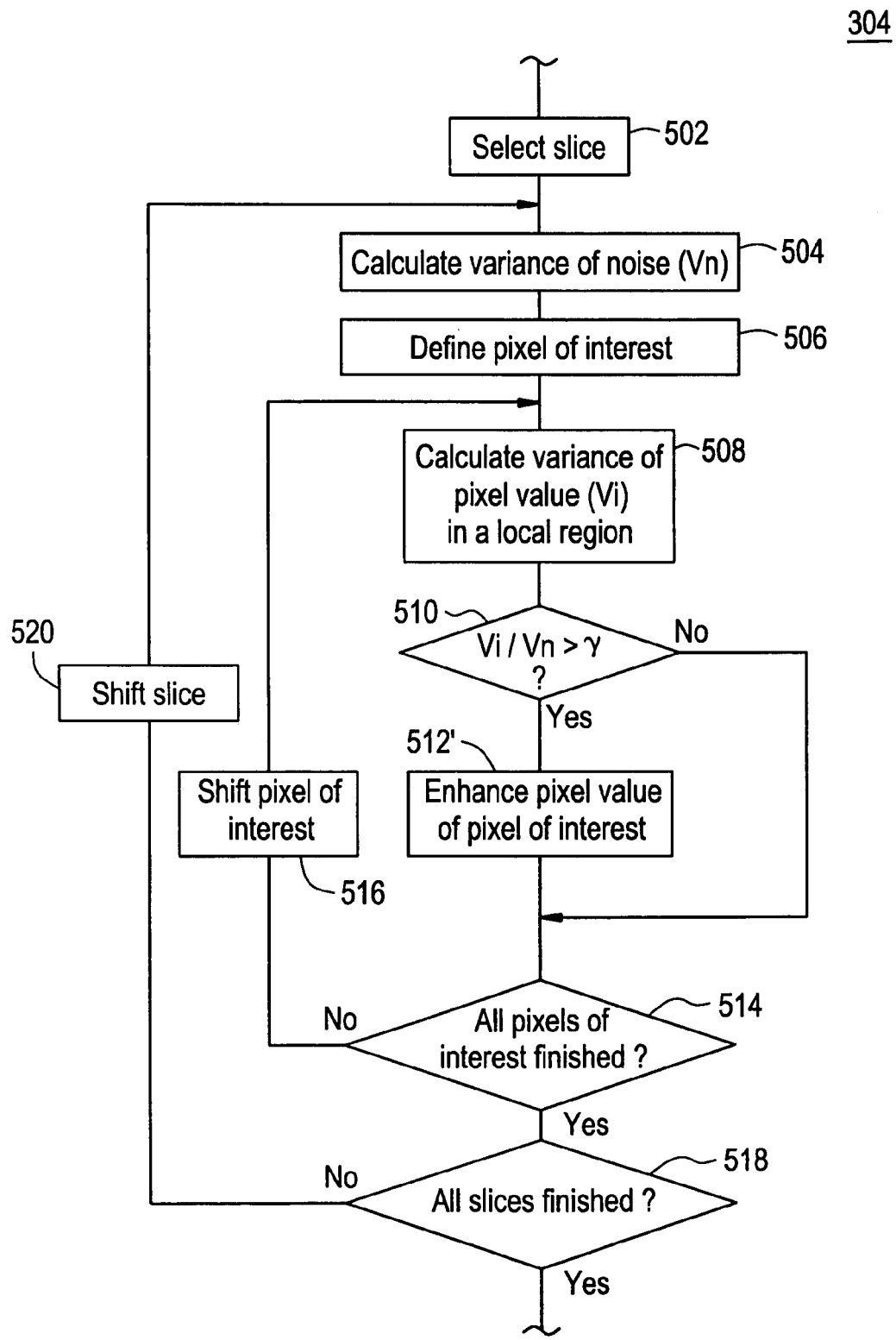
FIG. 13 is a detailed flow chart of part of the flow chart shown in FIG. 3.

FIG. 13 shows a flow chart of another procedure of the pixel value adjustment. In FIG. 13, similar steps to those shown in FIG. 5 are designated by similar reference numerals and the explanation thereof will be omitted. The difference between the procedures shown in FIGS. 5 and 13 is in pixel value processing after the decision at Step 510.

Specifically, if the variance of pixel values is significantly larger than the variance of noise in a local region that contains a pixel of interest, the pixel value of the pixel of interest is enhanced at Step 512'. The enhancement of the pixel value is achieved by, for example, multiplying the pixel value by a coefficient $\beta$. The value of the coefficient $\beta$ is a positive number greater than one, for example, 1.2. Thus, the pixel value of the pixel of interest is enlarged by, for example, 1.2 times the original value. It should be noted that the value of the coefficient $\beta$ is not limited to 1.2 but may be any appropriate one. Moreover, instead of multiplying by a coefficient, the enhancement of the pixel value may be achieved by, for example, adding a certain predefined value to the pixel value.

If the variance of pixel values Vi in the local region that contains the pixel of interest is not significantly greater than the variance of noise Vn, no special operation is applied to the pixel value. Thus, the pixel value of the pixel of interest maintains its original value. The data processing section 170 that performs such pixel value adjustment is an embodiment of the pixel value adjusting means of the present invention.

Figure 14:
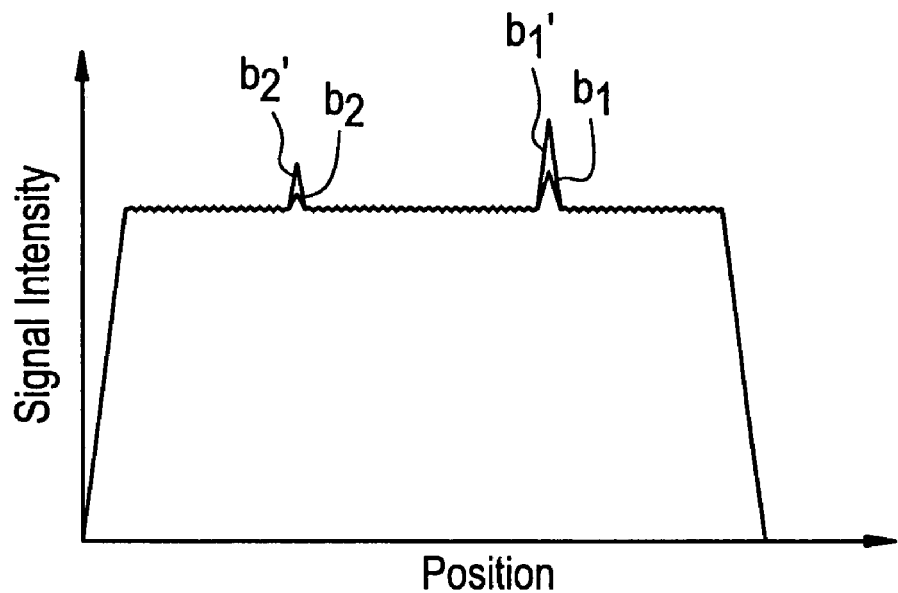
FIG. 14 is an example of image profiles showing an effect of pixel value adjustment.

FIG. 14 shows an effect of such pixel value adjustment by a change in a profile of pixel values. As shown, blood flow images b1 and b2 in a profile before the pixel value adjustment will have enlarged pixel values as a result of the aforementioned pixel value adjustment, as shown by blood flow images b1' and b2'. Thus, the difference from the background noise is enlarged and elicitability is enhanced.

Figure 15:
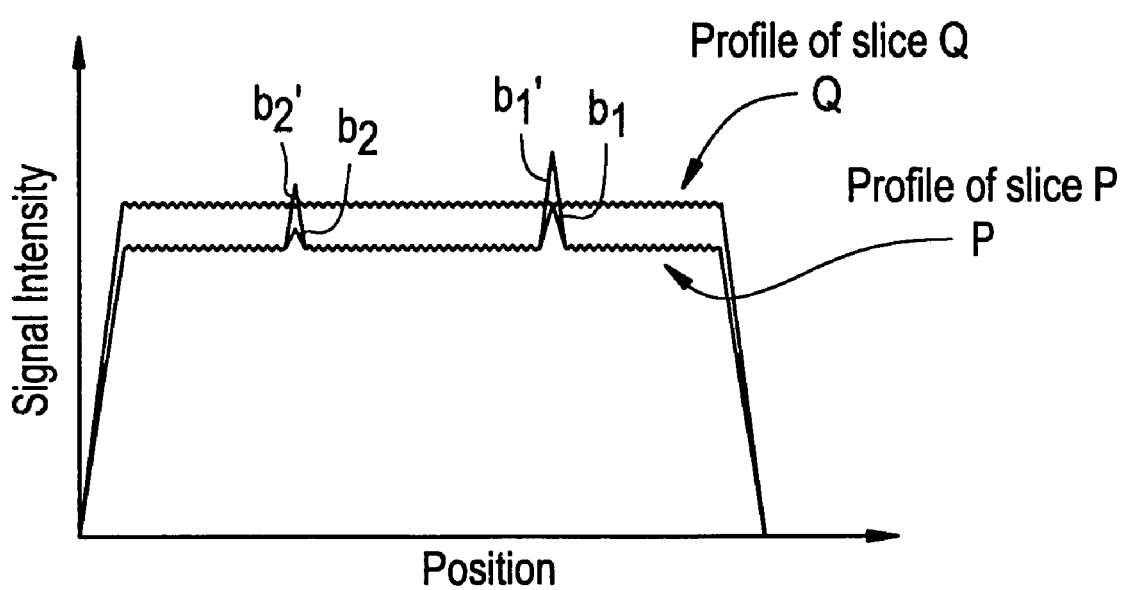
FIG. 15 is an example of image profiles showing an effect of pixel value adjustment.

FIG. 15 shows another effect of the pixel value adjustment. The symbols P and Q in FIG. 15 denote profiles of two images of different slices. Even when the background noise level of the profile Q is larger than the signal intensity of a distinct blood flow image b1 in the profile P, the pixel values of the blood flow images b1 and b2 in the profile P is enlarged by, for example, 1.2 times by the aforementioned pixel value adjustment, resulting in blood flow images b1' and b2'. Thus, the blood flow images b1' and b2' can also be elicited relative to the noise level of the image of the slice Q.

For the multi-slice images after the pixel adjustment as described above, maximum intensity projection (MIP) is performed at Step 306 in the flow chart of FIG. 3. The data processing section 170 that performs the maximum intensity projection at Step 306 is an embodiment of the maximum intensity projecting means of the present invention.

A program for a computer to implement the functions as described above is recorded on a recording medium in a computer-readable manner. For the recording medium, for example, any one of a magnetic recording medium, an optical recording medium, a magneto-optical recording medium and any other appropriate type of recording medium is employed. The recording medium may be a semiconductor storage medium. A storage medium is synonymous with a recording medium in the present specification.

Figure 16:
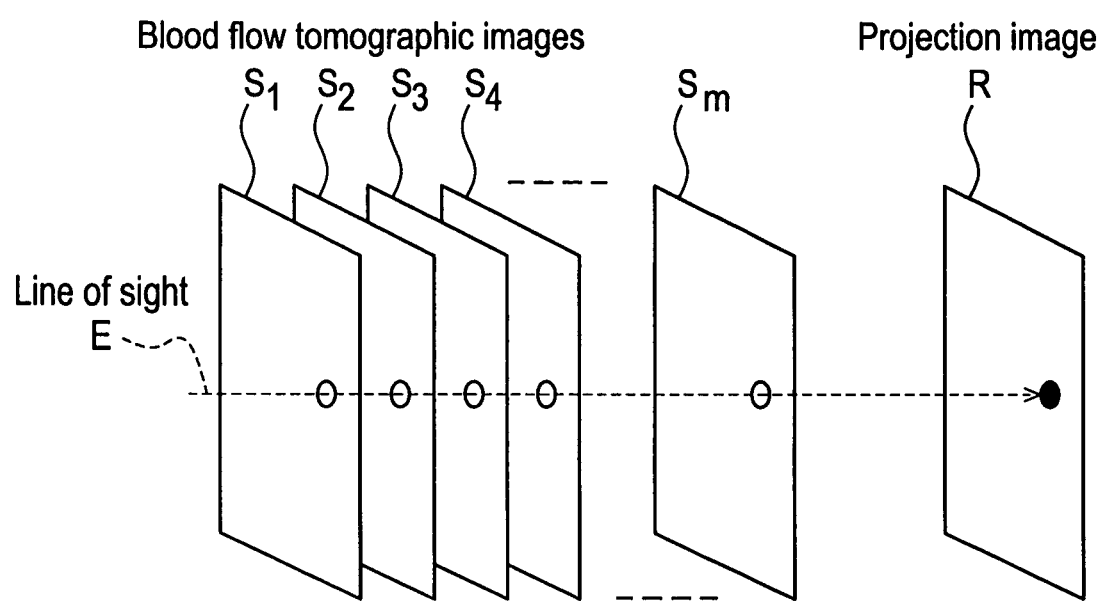
FIG. 16 is a conceptual diagram of maximum intensity projection.

FIG. 16 shows a conceptual diagram of the maximum intensity projection. As shown, the maximum of pixel values is extracted along a line of sight E passing through the multi-slice images S1–Sm, and the extracted value is used as a pixel value for a projection image R. A number of lines of sight that is equal to the number of pixels in the projection image R are employed as the line of sight E.

According to the pixel value adjustment as described above, since a difference between a blood flow image and noise is enhanced for every image S1–Sm, even a faint blood flow image can be distinctly rendered without being obscured by noise. Therefore, an MIP image having a distinct blood flow image can be obtained even if the blood flow image is faint. Such an MIP image is displayed on the display section 180 at Step 308.

The preceding description has been made on an example in which the image processing is performed by a data processing section in a magnetic resonance imaging apparatus; however, it will be easily recognized that the image processing may be performed by a data processing apparatus separate from the magnetic resonance imaging apparatus, such as an EWS (engineering workstation) or PC (personal computer).

Moreover, although the imaging apparatus has been described as being an MRI apparatus, the imaging apparatus is not limited thereto but may be any other type of imaging apparatus, such as an X-ray CT (computed tomography) apparatus, an X-ray imaging apparatus, PET (positron emission tomography) or a γ-camera.

Furthermore, while the description has been made with reference to an example of processing a medical image, the object to be processed is not limited to a medical image, but image processing on a variety of images, such as a digital image captured by an optical instrument, can be performed.

While the present invention has been described with reference to preferred embodiments hereinabove, various changes or substitutions may be made on these embodiments by those ordinarily skilled in the art pertinent to the present invention without departing from the scope of the present invention. Therefore, the technical scope of the present invention encompasses not only those embodiments described above but all the embodiments that fall within the scope of the appended claims.

What is claimed is:

1. An image processing method comprising the steps of:
   determining a variance of pixel values in a local region to which a pixel of interest belongs, wherein each pixel constituting an image is defined as said pixel of interest;
   maintaining pixel value of said pixel of interest when said determined value is larger than a particular variance of noise; and
   suppressing said pixel value of said pixel of interest when said determined variance is less than said particular variance of noise;
   wherein each pixel constituting multi-slice images, and the step of maintaining pixel value provides adjustment of pixel values; and further comprising the steps of:
   performing maximum intensity projection on said multi-slice images subjected to said pixel value adjustment; and
   adding to said determined variance a variance of pixel values in a local region to which a corresponding pixel of interest in an image of a neighboring slice belongs.

2. The method of claim 1, wherein said suppressing of said pixel value is performed by multiplying by a coefficient of less than one.

3. The method of claim 1, wherein said suppressing of said pixel value is performed by subtracting a predefined numeric value.

4. The method of claim 1, further comprising the steps of:
   determining a residual sum of squares of pixel values for each of a plurality of local regions defined over an entire image;
   determining a histogram of said residual sum of squares; and
   determining said particular variance of noise based on a residual sum of squares that gives a peak of said histogram.

5. The method of claim 1, wherein said image is of a blood flow image.

6. An image processing apparatus comprising:
   first means for determining a variance of pixel values in a local region to which a pixel of interest belongs, wherein each pixel constituting an image is defined as said pixel of interest;
   second means for maintaining pixel values of said pixel of interest when said determined variance is larger than a particular variance of noise;
   third means for suppressing said pixel value of said pixel of interest when said determined variance is less than said particular variance of noise;
   wherein each pixel constituting multi-slice images, and wherein said second means comprises means for adjusting said pixel value; and further comprising:
   fourth means for performing maximum intensity projection on said multislice images subjected to said pixel value adjustment; and
   fifth means for addding to said determined variance a variance of pixel values in a local region to which a corresponding pixel of interest in an image of a neighboring slice belongs.

7. The apparatus of claim 6, wherein said third means comprises means for suppressing said pixel value by multiplying with a coefficient of less than one.

8. The apparatus of claim 6, wherein said third means comprises means for suppressing said pixel values by subtracting a predefined numeric value.

9. The apparatus of claim 6, further comprising:
   sixth means for determining said particular variance of noise wherein said sixth means comprises:
   means for determining a residual sum of squares of pixel values for each of a plurality of local regions defined over an entire image;
   means for determining a histogram of said residual sum of squares; and
   means for determining said particular variance of noise based on a residual sum of squares that gives a peak of said histogram.

10. The apparatus of claim 6, wherein said image is of a blood flow image.

11. An image apparatus for producing an image based on signal collected from an object, said apparatus comprising:
   means for determining a variance of pixel values in a local region to which a pixel of interest belongs, said pixel of interest being defined as being each pixel constituting an image;
   means for maintaining said pixel value of said pixel of interest when said determined variance is larger than a particular variance of noise; and
   means for suppressing said pixel value of said pixel of interest when said determined variance is less than said particular variance of noise; wherein
   each pixel constitutes multi-slice images; and wherein
   said means for determining a variance of pixel values comprises means for adjusting said pixel values; and further comprising:
   means for performing maximum intensity projection on said multi-slice images subjected to said pixel value adjustment; and
   means for adding to said determined variance a variance of pixel values in a local region to which a corresponding pixel of interest in an image of a neighboring slice belongs.

12. A computer-readable medium having recorded thereon computer executable instructions for causing a computer to implement the functions of:
   determining a particular variance of noise;
   determining a variance of pixel values in a local region to which a pixel of interest belongs, wherein each pixel constituting an image is defined as said pixel of interest;

maintaining said pixel value of said pixel of interest when said determined variance is larger than said particular variance of noise; and suppressing said pixel value of said pixel of interest when said determined value is less than said particular variance of noise; wherein each pixel constitutes multi-slice images; and the step of maintaining pixel value provides adjustment of pixel values; and further comprising the functions of:

performing maximum intensity projection on said multi-slice images subjected to said pixel value adjustment; and adding to said determined variance a variance of pixel values in a local region to which a corresponding pixel of interest in an image of a neighboring slice belongs.

* * * * *